(12) United States Patent
Metzger et al.

(10) Patent No.: US 9,207,102 B2
(45) Date of Patent: Dec. 8, 2015

(54) ANTI-LOCK BRAKE ROTOR TONE RING CARTRIDGE AND SHAFT GUIDE

(71) Applicant: Dana Automotive Systems Group, LLC, Maumee, OH (US)

(72) Inventors: Seth A. Metzger, Maumee, OH (US); Michael Jason Horvath, Waterville, OH (US)

(73) Assignee: Dana Automotive Systems Group, LLC, Maumee, OH (US)

(*) Notice: Subject to any disclaimer, the term of this patent is extended or adjusted under 35 U.S.C. 154(b) by 402 days.

(21) Appl. No.: 13/920,111

(22) Filed: Jun. 18, 2013

(65) Prior Publication Data

US 2013/0340544 A1    Dec. 26, 2013

Related U.S. Application Data

(60) Provisional application No. 61/662,720, filed on Jun. 21, 2012.

(51) Int. Cl.
| | | |
|---|---|---|
| *B60T 8/32* | (2006.01) | |
| *F16D 66/00* | (2006.01) | |
| *G01D 11/30* | (2006.01) | |
| *G01P 3/488* | (2006.01) | |

(52) U.S. Cl.
CPC ............... *G01D 11/30* (2013.01); *B60T 8/329* (2013.01); *F16D 66/00* (2013.01); *G01P 3/488* (2013.01)

(58) Field of Classification Search
CPC ... B60T 8/329; B60T 8/322; F16D 2066/003; F16D 2127/002; F16D 2500/3115; F16D 2065/1388; F16D 2065/1392
See application file for complete search history.

(56) References Cited

U.S. PATENT DOCUMENTS

| | | | | |
|---|---|---|---|---|
| 3,551,712 | A | * | 12/1970 | Jones ...................... B60T 8/329 310/168 |
| 3,916,234 | A | * | 10/1975 | Stigall ..................... B60T 8/329 310/155 |
| 3,949,841 | A | | 4/1976 | Jovick et al. |
| 3,988,624 | A | * | 10/1976 | Urban ..................... G01P 3/488 310/168 |
| 4,029,180 | A | * | 6/1977 | Gee .......................... B60T 1/06 188/181 R |
| 4,090,592 | A | | 5/1978 | Jovick et al. |
| RE30,847 | E | * | 1/1982 | Gee .......................... B60T 1/06 188/181 R |
| 4,689,557 | A | | 8/1987 | Smith et al. |
| 4,901,562 | A | | 2/1990 | Beakas et al. |
| 4,953,670 | A | | 9/1990 | Chemelewski |
| 5,067,350 | A | | 11/1991 | Grillo et al. |
| 5,223,760 | A | | 6/1993 | Peck et al. |
| 5,227,719 | A | | 7/1993 | Peterson et al. |
| 5,476,272 | A | | 12/1995 | Hixson, II |
| 5,486,757 | A | | 1/1996 | Easley |
| 5,564,839 | A | | 10/1996 | Ouchi et al. |
| 5,570,013 | A | | 10/1996 | Polinsky et al. |
| 5,584,777 | A | | 12/1996 | Sander et al. |
| 5,603,575 | A | | 2/1997 | Ouchi |
| 5,695,289 | A | | 12/1997 | Ouchi et al. |
| 5,757,084 | A | | 5/1998 | Wagner |

(Continued)

FOREIGN PATENT DOCUMENTS

| | | | | |
|---|---|---|---|---|
| DE | 10237504 A1 | * | 3/2004 | ............. B60T 8/329 |
| EP | 0443939 A1 | | 8/1991 | |

*Primary Examiner* — David A Rogers
(74) *Attorney, Agent, or Firm* — Marshall & Melhorn, LLC (57) ABSTRACT

An anti-lock brake rotor tone ring cartridge has an inner piece and an outer piece. The outer piece fits at least partially within the inner piece so as to prevent the axial movement of the inner piece. A tone ring is located on the inner piece.

20 Claims, 6 Drawing Sheets

(56) References Cited

U.S. PATENT DOCUMENTS

| | | | | |
|---|---|---|---|---|
| 5,947,611 | A | 9/1999 | Nagase | |
| 6,149,244 | A | 11/2000 | Wagner | |
| 6,168,315 | B1 | 1/2001 | Nagase et al. | |
| 6,238,015 | B1 * | 5/2001 | Garcia | B60T 8/171 188/181 R |
| 6,549,001 | B1 | 4/2003 | Dobbs | |
| 6,664,780 | B2 | 12/2003 | Dobbs et al. | |
| 6,929,332 | B2 | 8/2005 | Naslund et al. | |
| 6,957,918 | B2 | 10/2005 | Beutler et al. | |
| 7,194,921 | B1 | 3/2007 | Fergus et al. | |
| 7,205,760 | B2 | 4/2007 | Swanson | |
| 7,233,138 | B2 | 6/2007 | Michalek et al. | |
| 7,241,243 | B2 * | 7/2007 | Duncan | B60K 17/16 324/174 |
| 7,288,930 | B2 | 10/2007 | Clark | |
| 7,345,469 | B2 | 3/2008 | Swansno | |
| 7,384,359 | B2 | 6/2008 | Pinkos | |
| 7,503,213 | B2 | 3/2009 | Campbell | |
| 7,559,521 | B2 | 7/2009 | White | |
| 7,878,059 | B2 | 2/2011 | Campbell | |
| 8,167,762 | B2 | 5/2012 | Zink et al. | |
| 8,230,739 | B2 | 7/2012 | LeMerise | |
| 2002/0175258 | A1 * | 11/2002 | White | B23P 15/00 248/314 |
| 2003/0050749 | A1 * | 3/2003 | Cervantez | B60G 17/01933 701/49 |
| 2003/0160605 | A1 | 8/2003 | Michalek | |
| 2006/0124411 | A1 * | 6/2006 | Redgrave | G01D 5/147 188/218 XL |
| 2006/0272906 | A1 * | 12/2006 | Gonska | B60T 8/329 188/218 XL |
| 2009/0188762 | A1 * | 7/2009 | Hester | B60T 8/329 188/73.1 |
| 2009/0218183 | A1 * | 9/2009 | Burgoon | B60T 8/329 188/218 XL |
| 2010/0032251 | A1 * | 2/2010 | Bradley | F16D 66/00 188/218 XL |
| 2010/0272380 | A1 * | 10/2010 | Zink | B60T 8/171 384/448 |
| 2010/0281975 | A1 | 11/2010 | LeMerise | |
| 2011/0009199 | A1 | 1/2011 | Yamauchi | |
| 2011/0133046 | A1 | 6/2011 | LeMerise et al. | |
| 2012/0291545 | A1 | 11/2012 | LeMerise et al. | |

* cited by examiner

FIG. 1

PRIOR ART

ANTI-LOCK BRAKE ROTOR TONE RING CARTRIDGE AND SHAFT GUIDE

RELATED APPLICATIONS

This application claims priority to and the benefit of U.S. Patent Application Ser. No. 61/662,720 filed on Jun. 21, 2012, which is fully incorporated by reference in its entirety herein.

BACKGROUND OF THE INVENTION

Anti-lock brake rotor sensors are often located in, or adjacent, the shaft housing brake flange. It can be appreciated that being located adjacent the brakes that heat can build up. The heat can adversely affect the sensor. In other designs, there is not enough room for the sensor in or adjacent the brake flange. Thus, for either reason an alternative location is preferred. The sensor can be moved inboard of the brake flange to resolve the space and heat issues, however, the inboard located sensor must be accommodated when the shaft is assembled.

Another problem encountered in some shaft designs, such as semi-float configurations, is that if an ABS rotor is to be installed in the wheel end it has to be pressed into the shaft housing prior to the bearing and seal installation. In a semi-float configuration, a solution also needs to allow for shaft end float, for the installation of a C-clip and for lubricant to flow freely within the shaft housing.

In some instances, such as the semi-float configuration mentioned above, or a full float version, the shaft is installed in the shaft housing in a "blind" fashion. That is, the installer cannot see the end of the shaft being connected to the differential spline. A solution is needed to accommodate the blind installation for both semi-float and full float configurations.

Further, for full float configurations a solution is needed where the shaft can be installed blindly but not interfere with the inboard located sensor. In addition, a solution is needed wherein the shaft and/or ABS system can be serviced without dislocating the brake rotor, that allows for the free rotation of the ABS rotor and allows lubricant to flow freely within the shaft housing. The solution should accommodate full float, semi-float and independent shaft systems. Further, the solution should be adaptable to locations other than shaft shafts, such as power take off shafts and the like.

SUMMARY OF THE INVENTION

An anti-lock brake rotor tone ring cartridge has an inner piece and an outer piece. In one embodiment, the outer piece has two radially extending legs connected by an axial leg. The inner piece has two radially extending legs connected by at least one axially extending leg. Another axially extending leg is connected to one of the inner piece radially extending legs and has tone ring teeth formed thereon. The outer piece fits at least partially within the inner piece so as to prevent the axial movement of the inner piece. The pieces are separated by gaps to permit lubricant to flow around them.

In another embodiment, an inner piece has two legs oriented transverse one another and an outer piece has two legs oriented transverse one another. The legs of the pieces act as stops to prevent the tone ring from becoming axially displaced.

BRIEF DESCRIPTION OF THE FIGURES

The above will become readily apparent to those skilled in the art from the following detailed description when considered in the light of the accompanying drawings in which.

DETAILED DESCRIPTION OF THE PREFERRED EMBODIMENT

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
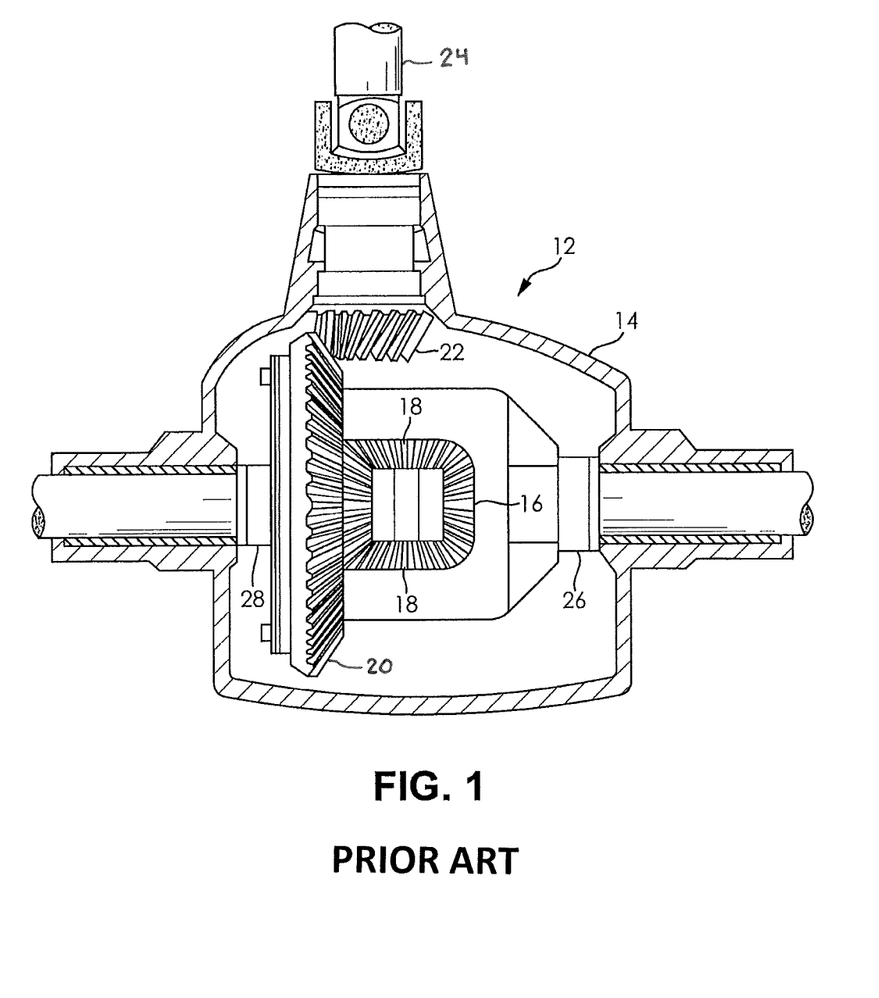
FIG. 1 is a schematic, cut away of one embodiment of a prior art differential.

Turning now to FIG. 1 one embodiment of a differential 12 is depicted. The differential 12 comprises a differential housing 14 and a plurality of gears within the housing 14. The gears are typically at least one side gear 16 and at least one pinion gear 18.

The differential housing 14 is connected to a ring gear 20, which is in driving contact with a drive pinion gear 22. The drive pinion gear 22 is connected to a source for rotation, such as a drive shaft 24 or the like.

Two shafts are typically connected to the differential 12. More particularly, a first end portion of one shaft 26 is connected to one of the differential side gears. A second, opposite end portion of the shaft 26 is connected to a wheel (not shown). A second shaft 28 is connected to the differential and another wheel in a similar fashion. The shafts are typically round in cross section.

The differential 12 allows the wheels located at the ends of the shafts 26, 28 to rotate at different speeds, such as when the vehicle is going around a corner, even though the shafts 26, 28 are connected to the same rotational power source.

While two shafts 26, 28 are typically provided, the following description will discuss a single shaft 30 with the understanding that the invention applies to both axles.

Figure 2:
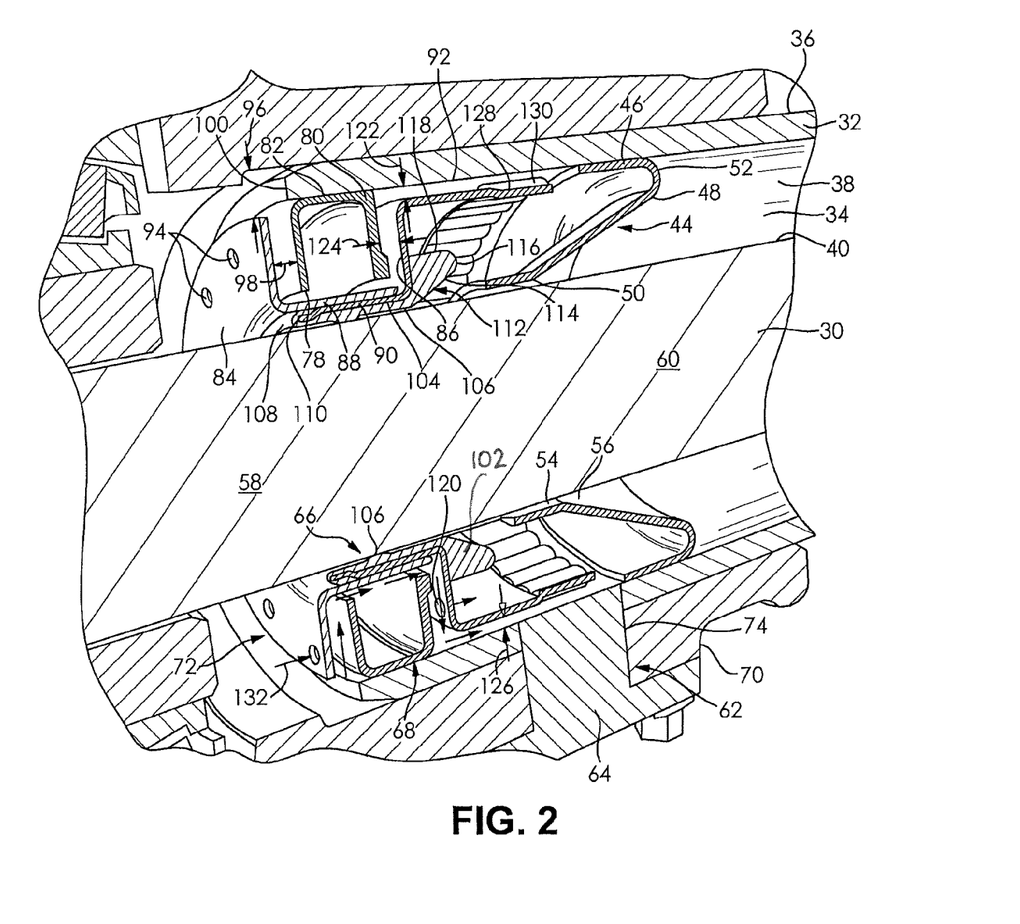
FIG. 2 is a cutaway perspective view of one embodiment.

As shown in FIG. 2, the shaft 30 is located in a shaft housing 32. The shaft housing 32 typically extends from the differential housing to the second end portion of the shaft 32, which may be adjacent the wheel. The shaft housing 32 is substantially tubular with a hollow interior 34 to accommodate the shaft 30. The shaft housing 32 has an outer surface 36 and an inner surface 38 where the inner surface 38 defines the hollow interior 34. An outer surface 40 of the shaft 30 is spaced apart from the inner surface 38 of the shaft housing 32 by a gap.

A shaft guide 44 may be located in the gap 42 between the outer surface 40 of the shaft 30 and the inner surface 38 of the shaft housing 32. The guide 44 may be defined by two legs. A first leg 46 abuts the inner surface 38 of the shaft housing 32. The first leg 46 may extend substantially parallel to the inner surface 38 of the shaft housing 32.

The second leg 48 extends away from the first leg 46 toward the outer surface 40 of the shaft 30. Preferably, the second leg 48 extends at an angle toward the outer surface 40 of the shaft 30. The angle of the second leg 48 may be such that it extends at least partially radially under the first leg 46. The figures depict the second leg 48 extending at a diagonal from the first leg 46 toward the shaft 30, but other angles are permissible. As shown in the depicted embodiment, the second leg 48 may extend axially beyond the first leg 46. In this embodiment, the second leg 48 extends axially inboard of the first leg 46.

The second leg 48 may also comprise an end portion 50 that extends parallel to the outer surface 40 of the shaft 30. The second leg end portion 50 contacts and extends parallel along the outer surface 40 of the shaft 30. The second leg end portion 50 may be of equal length compared to the first leg 46 or it may be longer or shorter. In the depicted embodiment, the second leg end portion 50 is shorter than the first leg 46.

The first and second legs 46, 48 are connected to one another by a connection portion 52. As shown in the figures, the connection portion 52 may be curvilinear, but the present embodiment is not limited to a curvilinear connection portion 52. Instead, the connection portion 52 maybe angled, such as obtuse or acute.

The shaft guide 44 may be unitary and one piece, as depicted in the figures, or it may be comprised of one or more pieces. The shaft guide 44, in whole or in part, may be constructed of a single material or it may be comprises of a plurality of materials. Suitable materials include metal, plastic, paper, cardboard, and/or fiberglass.

An aperture 54 extends through a central portion 56 of the shaft guide 44. Preferably, the aperture 54 is defined by the second leg end portion 50. The second leg end portion 50 defines the aperture 54 with a constant diameter. The diameter is slightly larger than the diameter of the shaft 30.

The shaft guide 44 assists in locating the shaft 30 as it is inserted into the shaft housing 32. Preferably, the shaft guide 44 locates the shaft 30 in a predetermined preferred position with the shaft housing 32. More particularly, the shaft guide 44 ensures that when the shaft 30 is installed in the housing 32, that it does not damage an anti-lock brake rotor cartridge, described in more detail below.

The second leg 48 of the shaft guide 44, and to a certain extent, the first leg 46 of the shaft guide 44, direct an end portion 58 of the shaft 30 to a center of the shaft housing 32 when the shaft 30 is installed. The end portion 58 of the shaft 30 may contact either leg 46, 48 during the installation process. The shape of the legs 46, 48, and in particular the angled inwardly directed second leg 48, guides the shaft end portion 58 to the center of the housing 32.

The shaft end portion 58 extends through the aperture 54 in the shaft guide 44. Preferably, the shaft end portion 58 extends beyond the aperture 54 and is connected to the differential 12. In the installed condition, a body portion 60 of the shaft 30 is located through the aperture 54. More particularly, the outer surface 40 of the shaft body portion 60 is located adjacent, and may be in contact with, the second leg end portion 50.

The shaft guide 44 is helpful because often the shaft 30 is installed into the shaft housing 32 blindly. In other words, the installer cannot see the end portion 58 of the shaft 30 as it moves into the shaft housing 32. Therefore, the installer cannot know the exact axial position, radial position or angle of the shaft end portion 58 inside the shaft housing 32. Installation of the shaft 30 without being able to see inside the housing 32 is complicated by the fact that the shaft 30, its housing 32 and the various parts described herein are heavy metal parts that are not easy to manipulate, particularly manually.

An anti-lock brake sensor assembly 62 is located axially inward from the shaft guide 44. The assembly 62 comprises a sensor 64, an inner piece 66 and an outer piece 68. In the depicted embodiment, the sensor 64 is removably located within a sensor mount 70. The sensor mount 70 may be located through the differential case 12, or a shoulder extension thereof. In the depicted embodiment, the sensor mount 70 is located through the shoulder extension.

The inner piece 66 and the outer piece 68 comprise an anti-lock brake rotor tone ring cartridge 72. The cartridge 72 may be installed in whole at the same time or its individual parts may be installed in steps.

An aperture 74 extends through the sensor mount 70 from an outer surface 76 thereof through the shaft housing 32. An anti-lock brake sensor 64 as known to those skilled in the art is located within the sensor mount aperture 74.

By sensing changes in a magnetic field, the sensor 64 senses tone ring teeth that rotate past it. The sensed information is provided to a computer to calculate wheel speed and to monitor braking. The tone ring will be described below.

As shown in the figures, the aperture 74 is located radially outward from the second leg end portion 48. It can be appreciated, however, that the aperture 74, and thus the sensor 64, and the entire assembly 62 can be located other than as depicted.

The outer piece 68 may be such as a stamped metal, but other materials manufactured in other ways, such as casting, forging, molding and the like may be used. In one embodiment, the outer piece 68 may have a U-shaped cross section, as shown in the figures. The U-shape may be a single piece or it may be comprised of more than one piece.

The U-shape may be comprised of an inboard radially inward extending leg 78, an outboard radially inward extending leg 80, where these legs are connected by an axially extending leg 82. The axially extending leg 82 may be oriented parallel to the outer surface 36 of the shaft 30 and the inner surface 38 of the shaft housing 32. The axially extending leg 82 may be directly attached to the inner surface 38 of the shaft housing 32. The attachment may be made by fasteners, adhesives, male/female fittings and/or welding.

The two radially inwardly extending legs 78, 80 may be oriented transverse to the axially extending leg 82 or the radially extending legs 78, 80 may extend inwardly at an angle other than 90 degrees to the axially extending leg 82. The angles may be the same or different from one another.

The inner piece 66 may also be such as stamped metal, but other materials manufactured in other ways, such as casting, forging, molding and the like may also be used. The inner piece 66 may be a single piece, or it may be comprised of more than one piece.

As shown in the figures, the inner piece 66 is comprised of a first radially extending leg 84, a second radially extending leg 86, a first axially extending leg 88, a second axially extending leg 90 and a third axially extending leg 92. All the legs 84, 86, 88, 90, 92 are preferably connected together.

The first radially extending leg 84 is located axially nearest the differential 12. The first radially extending leg 84 is located parallel but axially spaced apart from the inboard radially inwardly extending leg 78 of the outer piece 68. The first radially extending leg 84 is located axially inboard with respect to the inboard radially inwardly extending leg 78 of the outer piece 68.

The first radially extending leg 84 may have a plurality of apertures 94 extending through it. The apertures 94 are preferably circumferentially spaced about the leg 84 at equal intervals from one another. The apertures 94 in FIG. 2 have the same general shape as one another. It is permissible, however, for the apertures 94 to have different spacing and shapes from those depicted in the figure.

Preferably, the first radially extending leg 84 does not extend radially to the inner surface 38 of the shaft housing 32. A radial gap 96 exists between the end of the first radially extending leg 84 and the inner surface 38 of the shaft housing 32. An axial gap 98 exists between the end of the first radially extending leg 84 and an end 100 of the shaft housing 32 so that the end of the leg 84 is located axially inboard from the housing end 100.

As shown in the figures, the first radially extending leg 84 transitions into the first axially extending leg 88. The two legs 84, 88 are unitary and integrally formed with one another. The first axially extending leg 88 may be oriented transverse to the first radially extending leg 84, but other angles are permissible. The first axially extending leg 88 may be parallel to the outer surface 40 of the shaft 30 and the inner surface 38 of the shaft housing 32.

The second axially extending leg 90 is located radially inward from the first axially extending leg 88. Preferably, the second axially extending leg 90 is parallel both the first axially extending leg 88 and the outer surface 40 of the shaft 30.

A bell 102 is connected to the second axially extending leg 90. Preferably, the bell 102 is connected to a radially inner surface 104 of the second axially extending leg 90. At this location, the bell 102 is located in direct contact with the outer surface 40 of the shaft 30. More particularly, the bell 102 is rotationally fixed to the outer surface 40 of the shaft 30. The bell 102 may be rotationally fixed through the use of one or more convolutions 106, or beads, integrally formed with the bell 102 and in contact with the shaft 30.

The bell 102 extends axially along the second leg 90 and extends past the second leg 90 in both the inboard and outboard directions. An inboard end portion 108 of the bell 102 wraps around an inboard end portion 110 of the second leg 90 to axially secure the bell 102 and second leg 90. At an outboard end portion 112 of the bell 102, an inner surface 114 of the bell 102 diverges from the outer surface 40 of the shaft 30. The bell 102 diverges at a predetermined length and angle so as to create a funnel-shape. A curvilinear surface 116 connects the funnel shape to a cylindrical surface 118 that extends to the second radially extending leg 86. The cylindrical surface 118 and the second radially extending leg 86 are in direct contact with another.

The bell 102 forms another shaft guide that directs the shaft 30 during the assembly process into the proper location in a manner similar to the shaft guide 44 described above. More particularly, the inner diverging surface 114, or funnel shape, of the bell 102 functions to guide the end portion 58 of the shaft 30 into the center of the shaft housing 32, where it can then be connected to the differential.

The second radially extending leg 86 extends radially outward from, and transverse to, the first and second axially extending legs 88, 90. The second radially extending leg 86 may also extend at other angles to the first axially extending leg 88. The second radially extending leg 86 is parallel to, but axially offset from, the first radially extending leg 84. The second radially extending leg 86 is located axially outboard from the first radially extending leg 84.

The second radially extending leg 86 has a plurality of apertures 120 extending therethrough. The apertures 120 are preferably circumferentially spaced about the leg 86 at equal intervals from one another. The apertures 120 in FIG. 2 have the same general shape as one another. It is permissible, however, for the apertures 120 to have different spacing and shapes from those depicted in the figure. The apertures 120 may be aligned or misaligned with the first radially extending leg apertures 94. Preferably, they are aligned with one another and equal in number.

The second radially extending leg 86 extends radially outward substantially equivalent to the first radially extending leg 84. An end of the second radially extending leg 86 is located adjacent the inner surface 38 of the shaft housing 32, but separated by a gap 122.

An axial gap 124 separates the second radially extending leg 86 and the outboard radially inward extending leg 80 from the first piece 66.

The second radially extending leg 86 transitions into the third axially extending leg 92. The third axially extending leg 92 is substantially transverse to the second radially extending leg 86. The legs 86, 92 are unitary and integrally formed with one another. The third axially extending leg 92 extends parallel to the outer surface 40 of the shaft 30 and the inner surface 38 of the shaft housing 32. The third axially extending leg 92 is separated from the inner surface 38 of the shaft housing 32 by a constant radial gap 126.

The third axially extending leg 92 extends above the bell 102 and axially to the end portion 50 of the second leg 48 of the shaft guide 44. Preferably, the third axially extending leg 92 extends axially to the sensor aperture 74. As shown in FIG. 2, the third axially extending leg 92 extends in the axial direction so that the leg 92 terminates axially beneath the aperture 74.

An outer surface 128 of the third axially extending leg 92 has a plurality of teeth 130 extending from the outer surface 128 and/or formed with the outer surface 128. The teeth 130 extend continuously circumferentially about the outer surface 128 of the third leg 92. Preferably, the teeth 130 are equally spaced from one another. The teeth 130 comprise the tone ring for the ABS sensor system. The teeth 130 may also be separately attached to the axially extending leg 92.

The position of the third axially extending leg 92 is predetermined so that the teeth 130 are positioned at a predetermined axially and radially fixed position with respect to the sensor 64. The fixed position of the teeth 130 results in the sensor 64 obtaining an accurate speed and direction of the teeth 130.

Based on the foregoing, it can be appreciated that upon installation of the shaft 30, the second radially extending leg 86 of the inner piece 66 cannot move axially beyond the outboard radially inward extending leg 80 of the outer piece 68. Furthermore, after installation, it can be appreciated that the inboard radially inward extending leg 78 of the outer piece 68 prevents axial movement of the first radially extending leg 84 of the outer piece 68. Thus, the two complimentary pieces 66, 68 maintain the teeth 130 adjacent the sensor 64 so that the sensor 64 can reliably read the teeth 130 at all times.

While most axial movement is reduced by the two pieces 66, 68, some axial movement can be permitted. For example, the space between the pieces may be designed such that a C-clip design semi-float axle, which requires the shaft 30 to first be pushed inboard a predetermined distance, and then pulled into a final position in the outboard direction, to be installed.

It can also be appreciated from the foregoing that lubricant located between the shaft 30 and shaft housing 32 is permitted to flow through the apertures 94, 120 in the legs 84, 86 and around the ends of the legs 84, 86. A possible lubricant flow path 132 through the legs 78, 80, 84, 86 and around the legs 78, 80, 82, 84, 86, 88, 90, 92 is depicted in FIG. 2.

Figure 3:
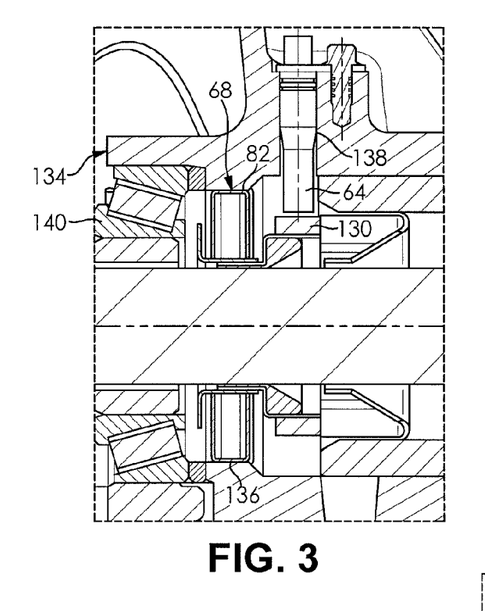
FIG. 3 is a cut away side view of another embodiment.

FIG. 3 depicts an alternative embodiment wherein the outer piece 68 is installed within a differential carrier 134. The outer piece 68 is as described above, but the outer piece axially extending leg 82 is parallel to and attached to an inner surface 136 of the differential carrier 134. A sensor aperture 138 is located through the differential carrier 134 so as to permit location of the sensor 64 adjacent the tone ring teeth 130 on the third axially extending leg 92. The inner piece 66 is located adjacent the shaft 30, but inboard from its location described above so at to also be within the differential carrier 134. The inner and outer pieces 66, 68 may be located outboard of a differential bearing 140 and inboard of the shaft end portion 58, as shown in the figure.

Figure 5:
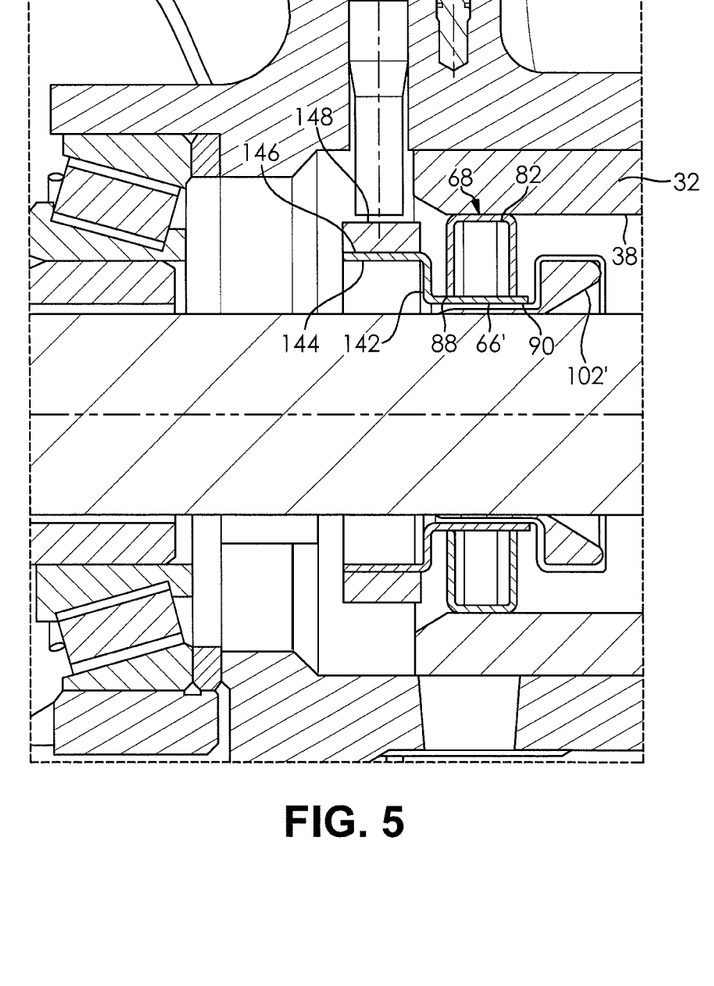
FIG. 5 is a cut away side view of another embodiment.

FIG. 5 depicts yet another embodiment. The outer piece 68 is located within the shaft housing 32. More particularly, the axially extending leg 82 of the outer piece 68 is in direct contact with the inner surface 38 of the shaft housing 32.

The first axially extending leg 88 of the inner piece 66' is connected to an inboard radially extending leg 142. An inboard axially extending leg 144 is directly connected to the inboard radially extending leg 142. The inboard axially extending leg 144 extends in an axially inboard fashion from the inner piece 66'. An outer surface 146 of the inboard axially extending leg 144 has a ring comprising a plurality of teeth 148 extending therefrom and/or formed therewith. The teeth 148 preferably extend continuously circumferentially about the outer surface 146 of the leg 144 to form a tone ring as described above.

The inner piece 66' has a second axially extending leg 90, as described above, and a second radially extending leg 86. The second radially extending leg 86 in this embodiment defines a cup to hold the bell 102'. The second radially extending leg 86 does not have the tone ring. Thus, it can be appreciated that the inner and outer pieces 66', 68 can be substantially located within the shaft housing 32, except for the tone ring.

Figure 4:
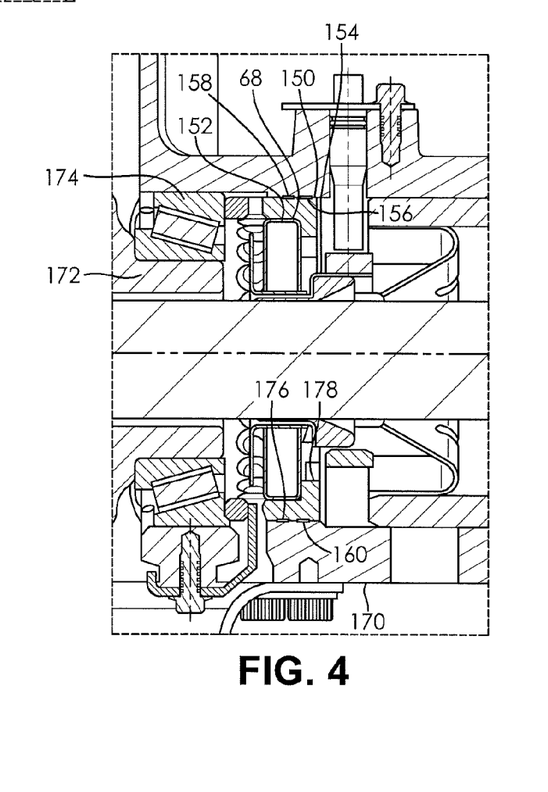
FIG. 4 is a cut away side view of another embodiment.

FIG. 4 depicts yet another embodiment wherein the outer piece 68 is installed within a threaded bearing adjuster 150. The threaded bearing adjuster 150 has an inner surface 152 and an outer surface 154. The outer surface 154 has a set of threads 156. The threads 156 engage a complimentary set of threads 158 on an inner surface 160 of a differential carrier 170. The engaged threads 156, 158 permit the adjuster 150 to provide axial preload to an adjacent differential bearing 172. In the depicted embodiment, the adjuster 150 is in direct contact with the outer race 174 of the differential bearing 172.

The axially extending leg 82 of the outer piece 68 is in direct contact with the inner surface 160 of the bearing adjuster 150. More particularly, the inner surface 160 of the adjuster 150 has an L-shape. The axially extending leg 82 is in direct contact with an axially extending leg 176 of the L, while the outboard radially extending leg 80 of the inner piece 66 is in direct contact with the radially extending leg 178 of the L. The inner piece 66 is located adjacent the shaft 30. The inner and outer pieces 66, 68 may be located outboard of a differential bearing 180 and inboard of the shaft housing end 100, as shown in the figure.

Figure 6:
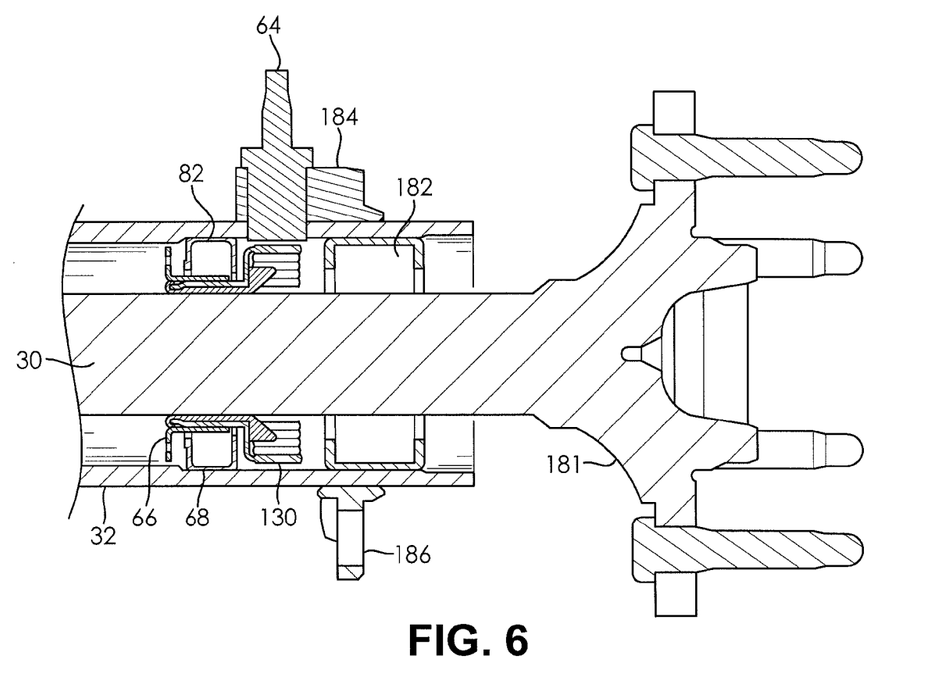
FIG. 6 is a cut away side view of another embodiment.

FIG. 6 depicts the structures described and depicted in FIG. 2, but in a different location and without the shaft guide 44. Namely, the inner and outer pieces 66, 68 are located adjacent a wheel end 181. At this location, the axially extending leg 82 of the outer piece 68 is pressed fit into the shaft housing 32. The shaft 30 is rotatably mounted within the housing 32 by a wheel end bearing 182. The shaft 30 passes through the interior of the wheel end bearing 182 and the inner piece 66.

The sensor 64 is located adjacent the teeth 130 to pick up the magnetic field and deliver the sensed field to a vehicle system ECU (not pictured). The sensor 64 is located onto the shaft housing 32 through an ABS boss 184 to position the sensor 64 a correct distance away from the teeth 130.

Figure 7:
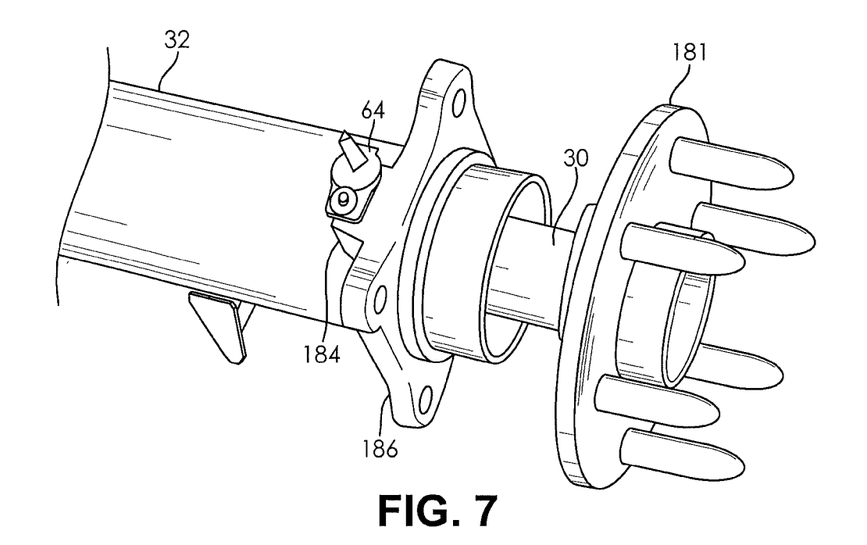
FIG. 7 is a perspective view of the embodiment of FIG. 6.

FIG. 7 shows the ABS boss 184 integrated into the tube flange 186. The integrated tube flange 186 and boss 184 are welded together to the housing 32. After welding, a hole is drilled into the boss 184 and into the housing 32 to house the sensor 64.

Figure 8:
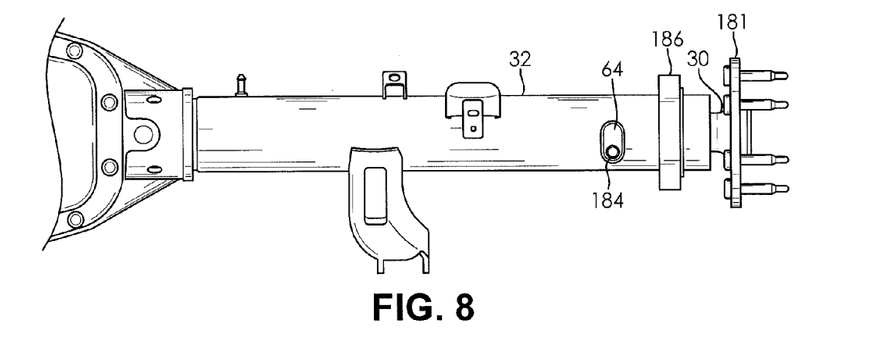
FIG. 8 is another embodiment.

FIG. 8 depicts an alternative embodiment wherein the tube flange 186 and the boss 184 are not integrated with one another. Instead, the tube flange 186 and the boss 184 are separately formed and separately attached, such as by welding, to the housing 32. This embodiment permits the sensor 64 to be placed in a location other than at the tube flange 186. This may be particularly advantageous to keep the sensor from heat generated by braking at the wheel end.

Figure 9:
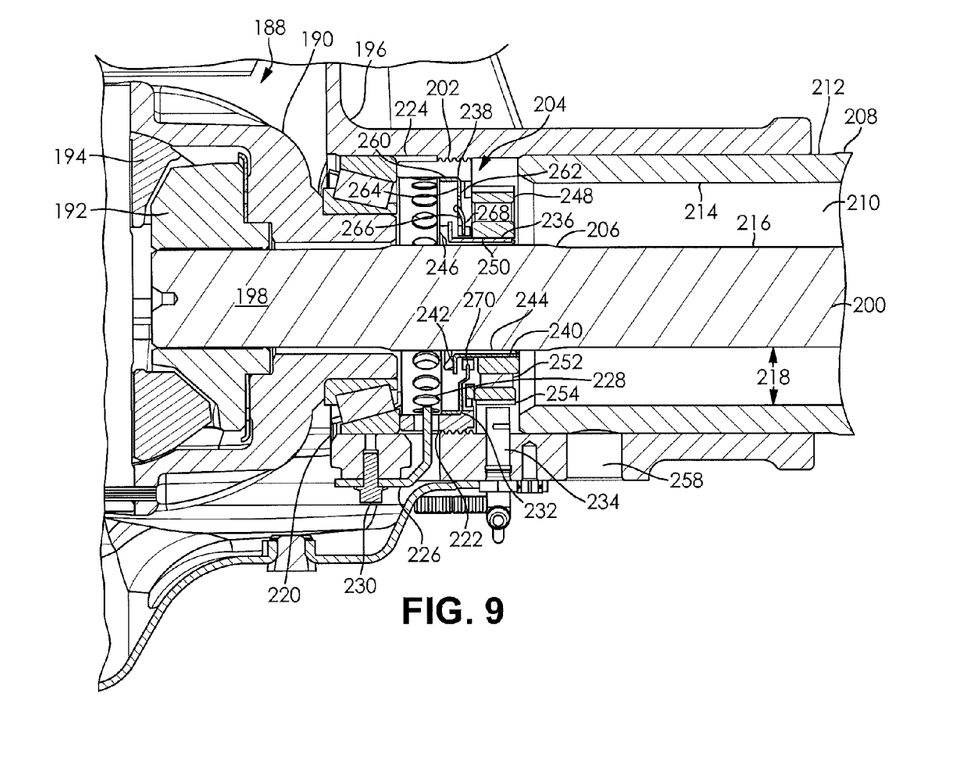
FIG. 9 is a cut away side view of another embodiment.

FIG. 9 depicts yet another embodiment. One half of a differential 188 is depicted. The differential 188 comprises a differential housing 190 and a plurality of gears within the housing 190. The gears are typically at least one side gear 192 and at least one pinion gear 194. The differential housing 190 is located in a differential carrier 196, which is partially depicted in the figure.

A first end 198 of a shaft 200 is connected to one of the side gears 192. The shaft 200 has a substantially constant outer diameter, except adjacent a bearing adjuster 202 and an antilock brake sensor assembly 204. Radially inward from the bearing adjuster 202 and the assembly 204, the outer diameter of the shaft 200 increases. The increased diameter portion 206 of the shaft 200 in this location functions as a lubricant dam. The dam prevents or reduces lubricant from going between the assembly 204 and the shaft 200, which could cause the assembly 204 not to rotate with the shaft 200 and thus provide an erroneous signal.

The shaft 200 is located in a shaft housing 208. The shaft housing 208 typically extends from the differential carrier 196 and substantially the length of the shaft 200. In the depicted embodiment, the shaft housing 208 fits within the differential carrier 196. The shaft housing 208 is substantially tubular with a hollow interior 210 to accommodate the shaft 200. The shaft housing 208 has an outer surface 212 and an inner surface 214 where the inner surface 214 defines the hollow interior 210. An outer surface 216 of the shaft 200 is spaced apart from the inner surface 214 of the shaft housing 208 by a gap 218.

The differential housing 190 is mounted for rotation within the differential carrier 196. A differential bearing 220 is located between the housing 190 and the carrier 196. The bearing adjuster 202 is threadably attached at its outside surface 222 to an inside surface 224 of the carrier 196. The axial position of the bearing adjuster 202 can be changed by threading the adjuster 202 into or away from the bearing 220. The movement of the bearing adjuster 202 with respect to the differential bearing 220 changes the backlash and preload on the bearing 220.

When the backlash and preload on the bearing 220 have been set, the position of the bearing adjuster 202 is locked by an insert 226. One end of the insert 226 is located in one of the plurality of holes 228 in the bearing adjuster 202. The other end of the insert 226 is secured by a mechanical fastener 230 or the like.

An inner surface 232 of the bearing adjuster 202 houses the anti-lock brake sensor assembly 204. The assembly 204 comprises a sensor 234, an inner piece 236 and an outer piece 238. The inner piece 236 comprises an L-shaped stamping. A first leg 240 of the L extends parallel the outer surface 216 of the shaft 200. The second leg 242 of the L extends transverse the first leg 240 on an end thereof. The second leg 242 extends radially outward from the outer surface 216 of the shaft 200. The first and second legs 240, 242 are preferably one-piece, integrally formed and unitary with one another.

The first leg 240 and at least a portion of the second leg 242 are located in an elastomeric material 244. The elastomeric material 244 may be bonded to the legs 240, 242. The elastomeric material 244 also functions to bond the first leg 240 to the outer surface 216 of the shaft 200. The elastomeric material 244 may form an angled surface 246 on the inboard side of the second leg 242.

A tone ring 248 is connected to the inner piece 236. More particularly, the tone ring 248 has an inner surface 250 that connects with the first leg 240 opposite the second leg 242. The tone ring 248 may be pressed on the first leg 240. The tone ring 248 has at least two spokes 252 that extend radially outward from the first leg 240. The spokes 252 support tone ring teeth 254. The teeth 254 are positioned adjacent the tone ring sensor 234 extending through a shoulder 258 of the differential carrier 196.

The outer piece 238 comprises an L-shaped stamping. A first leg 260 extends parallel to and is directly connected with the inner surface 232 of the bearing adjuster 202.

A second leg 262 is connected to an end of the first leg 260. The second leg 262 extends radially inward toward the shaft 200. The second leg 262 comprises three portions. A first portion 264 extends transverse the first leg 260, a second portion 266 is angled with respect to the first portion 264 and a third portion 268 is parallel the first portion but axially offset therefrom. The second leg third portion 268 of the outer piece 238 is axially offset from the second leg inner piece 242. The first and second legs 260, 262 are preferably one piece, integrally formed and unitary with one another.

An elastomeric material 270 is located about the third portion 268 of the outer piece 238. The elastomeric material 270 abuts the second leg 242 of the inner piece 234. The elastomeric material 270 may be ring shaped and have a square cross-section.

The outer piece 238, through the third portion 268 and its elastomeric material 270, prevents the inner piece 236, and the tone ring 248 mounted thereon, from moving axially away from the sensor 234. Additionally, the tone ring 248 prevents the outer piece 238, from moving axially away from the sensor 234. More particularly, the elastomeric material 270 abuts the tone ring 248 and prevents it, and the outer piece 238, from moving in the outboard axial direction. The arrangement thus ensures accurate tone ring measurements by the sensor 234.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tone ring cartridge, comprising:
    an inner part, comprising:
        a first radially extending leg connected to a first axially extending leg;
        a second axially extending leg at least partially concentric with said first axially extending leg, said second axially extending leg connected to a second radially extending leg;
        a third axially extending leg connected to said second radially extending leg, said third axially extending leg having tone wheel teeth thereon;
    an outer part, comprising:
        a first inboard radially extending leg connected to an axially extending leg which is connected to a second outboard radially extending leg.

2. The tone ring cartridge of claim 1 wherein said inner piece first radially extending leg and said second radially extending leg both have a plurality of fluid apertures formed therethrough.

3. The tone ring cartridge of claim 1, wherein a bell is connected to the inner piece second axially extending leg.

4. The tone ring cartridge of claim 1, wherein an outboard portion of the bell has a funnel shape with a central aperture.

5. The tone ring cartridge of claim 1, wherein said inboard and outboard radially extending legs of said outer piece are axially located within said first and second radially extending legs of said inner piece.

6. The tone ring cartridge of claim 1, wherein said inner piece first radially extending leg is inboard of said outer piece inboard radially extending leg and said inner piece second radially extending leg is located outboard of said outer piece outboard radially extending leg.

7. The tone ring cartridge of claim 1, wherein radial lubricant gaps are located between said outer piece inboard and outboard radially extending legs and said inner piece first axially extending leg.

8. The tone ring cartridge of claim 1, wherein axial lubricant gaps are located between the outer piece radially extending legs and the inner piece radially extending legs.

9. The tone ring cartridge of claim 1, wherein said outer piece radially extending legs prevent axial movement of said inner piece radially extending legs.

10. The tone ring cartridge of claim 1, wherein said outer piece is generally U-shaped.

11. The tone ring cartridge of claim 1, wherein said inner piece first radially extending leg and inner piece second radially extending leg are parallel one another and transverse to said first, second and third axially extending legs.

12. The tone ring cartridge of claim 1, wherein said inner piece is secured for rotation with a shaft, said inner piece concentric with said shaft.

13. The tone ring cartridge of claim 12, wherein said inner piece second axially extending leg is in direct contact with an outer surface of said shaft.

14. The tone ring cartridge of claim 13, wherein said inner piece second axially extending leg transitions to said bell, and a bell inner surface diverges from said outer surface of said shaft.

15. The tone ring cartridge of claim 14, wherein a bell outer surface connects said bell inner surface to said inner part second radially extending leg.

16. The tone ring cartridge of claim 15, wherein said bell is concentric with said third axially extending leg.

17. A tone ring cartridge, comprising:
    an inner piece, comprising:
        an inner piece first leg extending parallel an outer surface of a shaft, said inner piece first leg connected to a first elastomeric material, wherein a tone ring is connected to said inner piece first leg;
        a inner piece second leg, connected to said inner piece first leg, extending radially outward from said outer surface of said axle, and transverse to said inner piece first leg;
    an outer piece, comprising:
        an outer piece first leg extending parallel to an inner surface of a bearing adjuster; and
        a outer piece second leg, connected to said outer piece first leg, extending radially inward from said bearing adjuster inner surface, said outer piece second leg axially offset from said inner piece second leg.

18. The tone ring cartridge of claim 17, further comprising a second elastomeric material on an end portion of said outer piece second leg for selectively abutting said inner piece second leg.

19. The tone ring cartridge of claim 17, wherein said outer piece second leg and said inner piece second leg are axially housed within said bearing adjuster, but said tone ring is not housed within said bearing adjuster.

20. The tone ring cartridge of claim 17, wherein said inner piece first leg is connected to said outer surface of said shaft with said first elastomeric material.

\* \* \* \* \*